(12) United States Patent
Wang et al.

(10) Patent No.: US 8,526,355 B2
(45) Date of Patent: Sep. 3, 2013

(54) METHOD AND APPARATUS IN RELAYING SYSTEM

(75) Inventors: Haifeng Wang, Shanghai (CN);
Xiaomei Xia, Jingmen Hubei (CN);
Shengyao Jin, Shanghai (CN); Honglin Hu, Shanghai (CN)

(73) Assignee: Nokia Corporation, Espoo (FI)

( * ) Notice: Subject to any disclaimer, the term of this patent is extended or adjusted under 35 U.S.C. 154(b) by 292 days.

(21) Appl. No.: 12/936,314

(22) PCT Filed: Apr. 2, 2008

(86) PCT No.: PCT/EP2008/053933
§ 371 (c)(1),
(2), (4) Date: Oct. 4, 2010

(87) PCT Pub. No.: WO2009/121405
PCT Pub. Date: Oct. 8, 2009

(65) Prior Publication Data
US 2011/0026427 A1 Feb. 3, 2011

(51) Int. Cl.
*H04J 3/08* (2006.01)
(52) U.S. Cl.
USPC ............................ 370/315; 370/252; 370/345
(58) Field of Classification Search
USPC .......................................... 370/252, 315, 345
See application file for complete search history.

(56) References Cited

U.S. PATENT DOCUMENTS

| | | | |
|---|---|---|---|
| 7,386,057 B2 * | 6/2008 | Ito et al. ........................ | 375/267 |
| 8,000,282 B2 * | 8/2011 | Chindapol et al. ............ | 370/315 |
| 8,259,672 B2 * | 9/2012 | Hochwald et al. ............ | 370/331 |
| 2002/0159537 A1 * | 10/2002 | Crilly, Jr. ....................... | 375/267 |
| 2008/0096488 A1 * | 4/2008 | Cho et al. ....................... | 455/69 |
| 2008/0108310 A1 * | 5/2008 | Tong et al. ...................... | 455/69 |
| 2008/0175183 A1 * | 7/2008 | Devroye et al. ............... | 370/315 |
| 2009/0160707 A1 * | 6/2009 | Lakkis ............................ | 342/367 |
| 2009/0221231 A1 * | 9/2009 | Weng et al. ..................... | 455/15 |

FOREIGN PATENT DOCUMENTS

| | | |
|---|---|---|
| WO | 99/37033 A | 7/1999 |
| WO | 2008/004916 A | 1/2008 |

OTHER PUBLICATIONS

International Search Report and Written Opinion received in corresponding Patent Cooperation Treaty Application No. PCT/EP2008/053933, Mar. 13, 2009, 9 pages.
Hammerstrom, Ingmar, et la., "MIMO Two-Way Relaying with Transmit CSI at the Relay", IEEE 8th Workshop on Signal Processing Advances in Wireless Communications, Jun. 1, 2007, 5 pages.
Vaze, Rahul, et al., "Capacity Scaling for MIMO Two-Way Relaying", IEEE International Symposium on Information Theory, Jun. 24, 2007, pp. 1451-1455.

(Continued)

*Primary Examiner* — Hassan Kizou
*Assistant Examiner* — Ashil Farahmand
(74) *Attorney, Agent, or Firm* — Squire Sanders (US) LLP

(57) ABSTRACT

An apparatus, comprising a channel estimator for estimating channel coefficients of communication channels of multiple-input-multiple-output communication, a precoder for applying the estimated channel coefficients to precode a transmit signal to cancel the impact of the communication channels on the transmit signal, a first controller for providing the transmit signal for multiple-input-multiple-output transmission in a first timeslot, a second controller for processing a multiple-input-multiple-output receive signal received in a second timeslot following the first timeslot, and a cancellator for cancelling the transmit signal from the receive signal.

14 Claims, 2 Drawing Sheets

(56) References Cited

OTHER PUBLICATIONS

Caleb, K Lo, et al., "Rate Bounds for MIMO Relay Channels Using Precoding", IEEE Global Telecommunications Conference, Nov. 28-Dec. 2, 2005, pp. 1172-1176.

Pabst, Ralf, et al., "Relay-based deployment concepts for wireless and mobile broadband cellular radio", IEEE Communications Magazine, vol. 42, Sep. 2004, pp. 80-89.

Sreng, V., "Relayer Selection Strategies in Cellular Networks with Peer-to-Peer Relaying", Proceedings of IEEE VTC Fall '03, Oct. 2003, 5 pages.

Wu, Hongyi, et al, "Integrated Cellular and Ad Hoc Relaying Systems: iCAR", IEEE Journal on Selected Areas in Communications, vol. 19, No. 10, Oct. 2001, pp. 2105-2115.

Shannon, Claude E., "Two-way communication channels", Proceedings of 4th Berkeley Symp. Math. Stat. and Prob., vol. 1, 1961, pp. 611-644.

Rankov, Boris, "Spectral Efficient Protocols for Nonregenerative Half-duplex Relaying", Proceedings of Allerton Conference on Communication, Control, and Computing, Sep. 2005, pp. 1356-1365.

Chen, Wei, et al., "A cross layer method for interference cancellation and network coding in wireless networks", Proceedings of IEEE ICC'06, Jun. 2006, pp. 3693-3698.

Notification of the First Office Action dated Oct. 10, 2012 corresponding to Chinese Patent Application No. 200880128506.3 and English translation thereof.

Ingmar Hammerström et al, "MIMO Two-Way Relaying with Transmit CSI at the Relay," IEEE, Signal Processing Advances in Wireless Communications, Jun. 1, 2007, 5 pages.

Notification of the Second Office Action dated Jun. 20, 2013 corresponding to Chinese Patent Application No. 200880128506.3 and English translation thereof.

\* cited by examiner

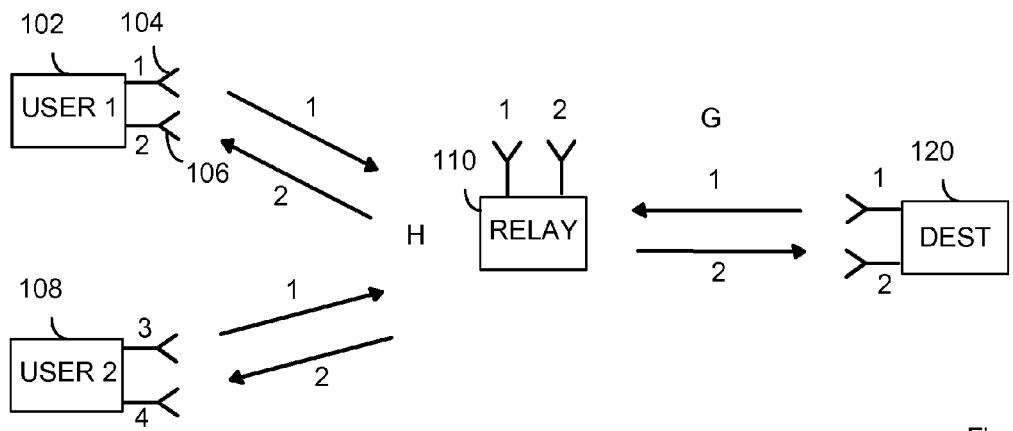
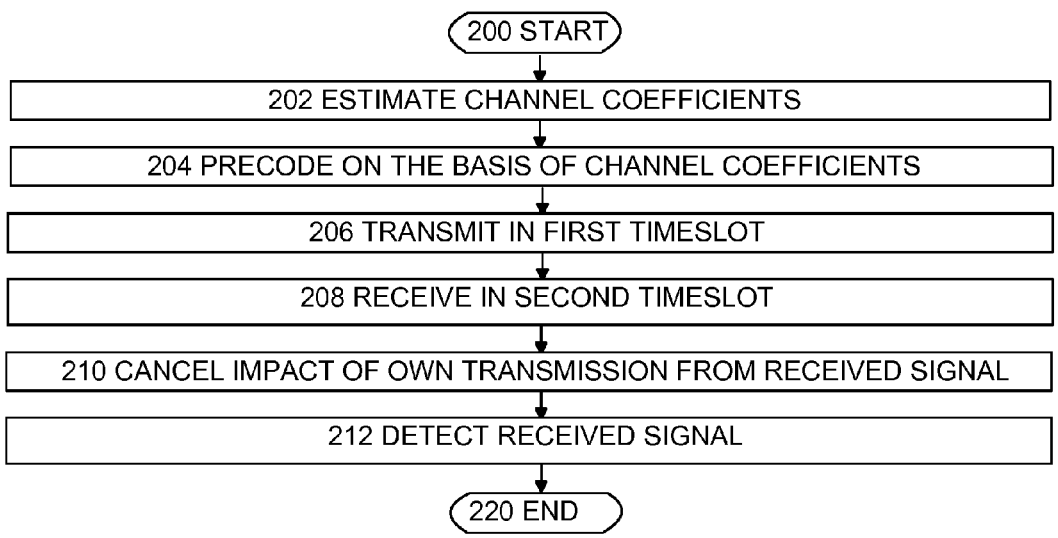

US 8,526,355 B2

METHOD AND APPARATUS IN RELAYING SYSTEM

RELATED APPLICATION

This application was originally filed as PCT Application No. PCT/EP2008/053933 filed on Apr. 2, 2008, which is incorporated herein by reference in its entirety.

FIELD

The invention relates to radio communication in a relaying system.

BACKGROUND

A new network infrastructure needs to be developed for next generation wireless communication systems. One key reason is that significantly higher data rates impose serious power implications. This is because the per symbol energy decreases linearly with increasing data rate given a fixed transmit power.

Relay-based multi-hop wireless networks seem to be an economically justifiable solution and have attracted research and industry interest.

Multi-hop networking may be applied for radio range extension in mobile and wireless broadband cellular networks and to combat shadowing at high radio frequencies. Through the exploitation of spatial diversity, multi-hop relaying can enhance capacity in the cellular networks.

SUMMARY

In a aspect, there is provided an apparatus, comprising a channel estimator configured to estimate channel coefficients of communication channels of multiple-input-multiple-output communication, a precoder configured to apply the estimated channel coefficients to precode a transmit signal to cancel impact of the communication channels on the transmit signal, a first controller configured to provide the transmit signal for multiple-input-multiple-output transmission in a first timeslot, a second controller configured to process a multiple-input-multiple-output receive signal received in a second timeslot following the first timeslot, and a cancellator configured to cancel the transmit signal from the receive signal.

In another aspect, there is provided an apparatus, comprising channel estimation means for estimating channel coefficients of communication channels of multiple-input-multiple-output communication, precoding means for applying the estimated channel coefficients for precoding a transmit signal for cancelling impact of the communication channels on the transmit signal, first control means for providing the transmit signal for multiple-input-multiple-output transmission in a first timeslot, second control means for processing a multiple-input-multiple-output receive signal received in a second timeslot following the first timeslot, and cancelling means for cancelling the transmit signal from the receive signal.

In still another aspect, there is provided a method, comprising estimating channel coefficients of communication channels of multiple-input-multiple-output communication, precoding a transmit signal by applying the estimated channel coefficients such as to cancel impact of the communication channels on the transmit signal, providing the transmit signal for multiple-input-multiple-output transmission in a first timeslot, processing a multiple-input-multiple-output receive signal received in a second timeslot following the first timeslot, and cancelling the transmit signal from the receive signal.

In still another aspect, there is provided a computer program embodied on a computer-readable medium, the program controlling a processor to perform estimating channel coefficients of communication channels of multiple-input-multiple-output communication, precoding a transmit signal by applying the estimated channel coefficients such as to cancel impact of the communication channels on the transmit signal, providing the transmit signal for multiple-input-multiple-output transmission in a first timeslot, processing a multiple-input-multiple-output receive signal received in a second timeslot following the first timeslot, and cancelling the transmit signal from the receive signal.

BRIEF DESCRIPTION OF THE DRAWINGS

In the following the invention will be described in greater detail by means of preferred embodiments with reference to the accompanying drawings, in which FIG. 1 shows an embodiment of an arrangement;

FIG. 2 shows an embodiment of a method;

DESCRIPTION OF EMBODIMENTS

Figure 3:
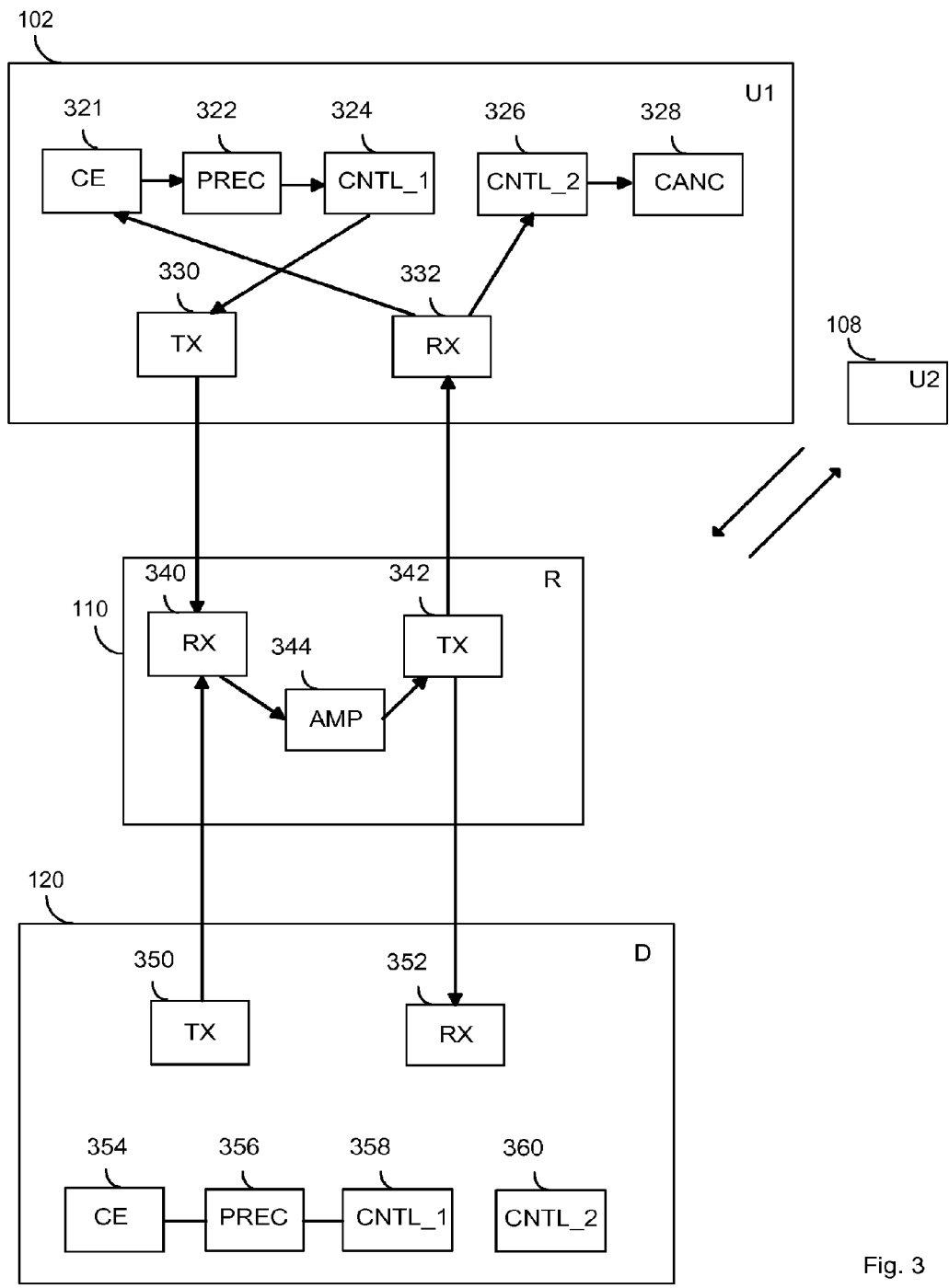
FIG. 3 shows an embodiment of an arrangement.

FIG. 1 shows on a high level an arrangement of a radio system employing relaying of signals.

The radio system may be a FDMA (Frequency Division Multiple Access) radio system applying TDD (Time Division Duplex) or FDD (Frequency Division Multiple Access) modes, for instance. An example of such a radio system is the 3GPP LTE (Long Term Evolution), which is a project within the Third Generation Partnership Project to improve the UMTS (Universal Mobile Telecommunications System) mobile phone standard to cope with future requirements.

In the embodiment of FIG. 1, a relay system is assumed. In a relay system, there is no direct radio link between a user station and a destination station communicating with each other. In FIG. 1, the user stations 102 and 108 are communicating with the destination station 120 via the relay station 110 and no direct link exists between the stations 102 and 120, for instance. Each of the stations 102, 108, 110 and 120 may be a mobile phone or a base station. In an embodiment, the user stations and the relay station are mobile phones and the destination station is a base station.

Each station 102, 108, 110, 120 has at least two radio antennas, which is illustrated by the numbered antennas 104, 106 of the first user station 102. Each antenna in FIG. 1 is numbered so as to allow reference to them in the following equations. The antennas of the first user station 102 are numbered "1" and "2", the antennas of the second user station 108 are numbered "3" and "4", the antennas of the relay station 110 and the destination station 120 are numbered "1" and "2".

As each station has at least two radio antennas, all the communication links between the stations, such as the link between the stations 102 and 110, are MIMO (multiple input multiple output) communication links. The channel between the user stations and the relay station is denoted by H and the channel between the relay station and the destination station is denoted by the communication links depicted in FIG. 1 are bi-directional meaning that the communication in the communication links is carried out in both directions. For instance, the station 108 may transmit a signal to the relay station 110, and receive a signal transmitted by the relay station.

The arrows between the stations in FIG. 1 have been numbered either by "1" or by "2". Arrows numbered by "1" depict communication in a first time instant, such as timeslot. Thus, in a first timeslot, stations 102, 108 and 120 transmit all simultaneously to the relay station 110. In the second timeslot, the relay station 110 transmits to all stations 102, 108 and 120.

FIG. 2 shows an embodiment of a method. In the embodiment of FIG. 2, a bi-directional multi-user MIMO relaying system with amplify-and-forward (AF) protocol is assumed. In the amplify-and-forward protocol, the relay station simply amplifies and forwards the received signals.

Applying the method to the situation in FIG. 1, there are thus one destination station 120, one relay station 110 and two user stations 102, 108. Each station is provided with two antennas in this example.

In the following, the method as a whole is first shortly described, and then the method steps are discussed more in detail.

In the method, transmission occurs in two timeslots. In the first timeslot, all the stations 102, 108 and 120 transmit to the relay station. The transmission is carried out via both transmit antennas. Each of the stations may transmit the same signal via both antennas to achieve space diversity in the transmission. In the case of the user signals, the transmit signal includes the signal to be transmitted to the destination station. In the case of the destination station, the transmit signal includes a transmit signal component to the first user station, and a transmit signal component to the second user station. As the transmission in the system is TDD transmission, each transmitting station may estimate 202 the channel coefficients from a signal received in a receive duplex of a TDD frame.

In 204, each transmitting station may precode the transmit signal so as to cancel the impact of the channel to the signal. Linear or non-linear precoding may be applied.

In 206, each of the transmitting stations may transmit in the first timeslot. That is, the first and second user stations, and the destination station all transmit simultaneously to the relay station.

The relay station may apply an amplify-and-forward protocol, and simply forward the received signals, after amplification, in the second timeslot.

In 208, the first and second user stations, and the destination station all receive the signal transmitted by the relay station.

In 210, each station may apply self-cancellation, that is cancel its own signal from the received signal. That is, the first station may cancel the signal transmitted by it in the first timeslot from the received signal.

Thereby, when detecting the desired signal 212, the stations need not worry about the signal transmitted by themselves in the first timeslot. For instance, in the case of the first station, the desired signal means the signal transmitted by the destination signal and targeted to the first station. After self-cancellation in the first user station, the received signal includes only signal components transmitted by the destination station and the second user station. When the signal component of the second user station is removed, the desired signal may be detected.

In the following, the method is discussed more in detail with reference to the arrangement of FIG. 1.

We may assume that the first user station 102 sends to the relay station a data stream $s_1$ targeting to the destination station, and simultaneously the second user station 108 sends to the relay station a data stream $8_2$ also targeting to the destination station. Simultaneously with the transmissions of the first user station 102 and the second user station 108, the destination station 120 sends to the relay station 110 two data streams $x_1$ and $x_2$ targeting to first user station 102 and the second user station 108, respectively. All the data streams are transmitted through the relay station 110 without direct link between the destination station and the user stations.

As the communication link between the first user station 102 and the relay station 110 is a MIMO communication link, there are four communication links between those. The first link is between the first antenna of the first user station and the first antenna of the relay station, the second link is between the first antenna of the first user station and the second antenna of the relay station, the third link exists between the second antenna of the first user station and the first antenna of the relay station, and the fourth link exists between the second antenna of the first user station and the second antenna of the relay station. Each of these links is characterized by a time varying channel coefficient depicting the deterioration caused by the channel to the signal transmitted in the channel. Thus, a channel coefficient matrix $H_1$ according to (1) may be provided to describe the channel between the first user station and the relay station.

$$H_1 = \begin{bmatrix} h_{11} & h_{12} \\ h_{21} & h_{22} \end{bmatrix}, \text{wherein} \tag{1}$$

the first index in each matrix element corresponds to the antenna of the relay station and the second index the antenna of the first user station.

Correspondingly, a channel coefficient matrix $H_2$ according to (2) between the second user station and the relay station may be established.

$$H_2 = \begin{bmatrix} h_{13} & h_{14} \\ h_{23} & h_{24} \end{bmatrix}, \text{wherein} \tag{2}$$

the first index in each matrix element depicts the antenna of the relay station and the second index in the matrix elements depicts the antenna of the second user station.

The channel between the relay station and the destination station may be depicted by the channel coefficient matrix G according to $$G = \begin{bmatrix} g_{11} & g_{12} \\ g_{21} & g_{22} \end{bmatrix}, \text{wherein} \tag{3}$$

the first index of each channel coefficients depicts the antenna of the relay station and the second index the antenna of the destination station.

All the quasi-static channel elements may be assumed to be independent zero mean complex Gaussian random variables. Due to the reciprocal of the TDD system, the transmitter may obtain the channel state information knowledge from a receive signal. That is, each station may measure the channel state in such timeslots it is receiving, and apply that information to such timeslots in which it is transmitting. This estimation of the channel coefficients is depicted in FIG. 2 by step 202.

In 204, each transmitter may apply precoding so as to before transmission cancel the effect the channel on the signal. In the precoding, the channel state information derived in 202 is utilized.

At the first and second user station side, linear zero-force (ZF) pre-equalization, or non-linear dirty-paper coding, for instance, may be applied to compensate for the channel impacts. The first user station 102 may transmit the same two data streams $$S_1 = \begin{bmatrix} s_1 \\ s_1 \end{bmatrix}$$

to the relay station 110. The data streams may be transmitted simultaneously by using different antennas of the first user station, and may be ZF precoded, for instance. The received signal at the relay station with two receive antennas from the first user station may be written as $$Y_1 = H_1 \alpha_1 W_1 S_1 + n, \text{ which} \quad (4)$$

may be written out to equation $$\begin{bmatrix} y_1^1 \\ y_2^1 \end{bmatrix} = \begin{bmatrix} h_{11} & h_{12} \\ h_{21} & h_{22} \end{bmatrix} \alpha_1 W_1 \begin{bmatrix} s_1 \\ s_1 \end{bmatrix} + n, \text{ where} \quad (5)$$

$$W_1 = H_1^H (H_1 H_1^H)^{-1}, \text{ and } \alpha_1 = \frac{1}{\|W_1 S_1\|}.$$

Superscript H denotes the Hermitian transpose, $\|\cdot\|$ is the vector norm, and n denotes the Gaussian noise. Assuming ideal knowledge of the quasi-static channel, the received signal at the relay station can be written as $$Y_1 = \begin{bmatrix} y_1^1 \\ y_2^1 \end{bmatrix} = \begin{bmatrix} s_1 \\ s_1 \end{bmatrix} + n. \quad (6)$$

Simultaneously with the first user station, the second user station transmits $$S_2 = \begin{bmatrix} s_2 \\ -s_2 \end{bmatrix}$$

with pre-equalization and via two transmit antennas. Thus, the second user station transmits the original signal ($s_2$) via the first transmit antenna, and a negation ($-s_2$) of the transmit signal via the second transmit antenna. In the same way as in (4) to (6), the received signal at the relay station from the second user station may be written as $$Y_2 = \begin{bmatrix} y_1^2 \\ y_2^2 \end{bmatrix} = \begin{bmatrix} s_2 \\ -s_2 \end{bmatrix} + n. \quad (7)$$

The destination may transmit the signals $$X = \begin{bmatrix} x_1 \\ x_2 \end{bmatrix}$$

with unitary precoding $$P = \begin{bmatrix} \frac{1}{\sqrt{2}} & -\frac{1}{\sqrt{2}} \\ \frac{1}{\sqrt{2}} & \frac{1}{\sqrt{2}} \end{bmatrix},$$

where $x_1$ and $x_2$ are targeted to the first user station and the second user station, respectively. In the same way as in (4) to (6), the received signal at the relay station from the destination station can be written as $$Y_3 = \begin{bmatrix} y_1^3 \\ y_2^3 \end{bmatrix} = \begin{bmatrix} \frac{1}{\sqrt{2}} x_1 - \frac{1}{\sqrt{2}} x_2 \\ \frac{1}{\sqrt{2}} x_1 + \frac{1}{\sqrt{2}} x_2 \end{bmatrix} + n. \quad (8)$$

Thus, the overall received signal at the relay station during the first timeslot with two receive antennas can be written as $$Y = Y_1 + Y_2 + Y_3 + n' \quad (9)$$

$$\begin{bmatrix} y_1 \\ y_2 \end{bmatrix} = \begin{bmatrix} y_1^1 \\ y_2^1 \end{bmatrix} + \begin{bmatrix} y_1^2 \\ y_2^2 \end{bmatrix} + \begin{bmatrix} y_1^3 \\ y_2^3 \end{bmatrix} + n'$$

$$= \begin{bmatrix} s_1 \\ s_1 \end{bmatrix} + \begin{bmatrix} s_2 \\ -s_2 \end{bmatrix} + \begin{bmatrix} \frac{1}{\sqrt{2}} x_1 - \frac{1}{\sqrt{2}} x_2 \\ \frac{1}{\sqrt{2}} x_1 + \frac{1}{\sqrt{2}} x_2 \end{bmatrix} + n', \text{ where}$$

$$= \begin{bmatrix} s_1 + s_2 + \frac{1}{\sqrt{2}} x_1 - \frac{1}{\sqrt{2}} x_2 \\ s_1 - s_2 + \frac{1}{\sqrt{2}} x_1 + \frac{1}{\sqrt{2}} x_2 \end{bmatrix} + n'$$

n' is the superimposes of the Gaussian noise of three links.

The relay station amplifies and forwards, in the second timeslot, the received signal Y to the destination station and to the two user stations by applying 2×2 multistream MIMO.

After equalization, $Y_1'$, $Y_2'$, $Y_3'$ can be attained by the destination station, and the first and second user stations, respectively.

The destination station can obtain $s_1$ and $s_2$ by applying self-cancellation with the knowledge of $x_1$ and $x_2$ as shown by $$\begin{bmatrix} y_{1,d} \\ y_{2,d} \end{bmatrix} = Y_1' - \begin{bmatrix} \frac{1}{\sqrt{2}} x_1 - \frac{1}{\sqrt{2}} x_2 \\ \frac{1}{\sqrt{2}} x_1 + \frac{1}{\sqrt{2}} x_2 \end{bmatrix} = \begin{bmatrix} s_1 + s_2 \\ s_1 - s_2 \end{bmatrix} \quad (10)$$

$$\Rightarrow \begin{cases} s_1 = \frac{1}{2}(y_{1,d} + y_{2,d}) \\ s_2 = \frac{1}{2}(y_{1,d} - y_{2,d}) \end{cases}$$

Similarly, the first user station and the second user station can estimate $x_1$ and $x_2$ as shown by (11) and (12), respectively $$\begin{bmatrix} y_{1,U1} \\ y_{2,U1} \end{bmatrix} = Y_2' - \begin{bmatrix} s_1 \\ s_1 \end{bmatrix} = \begin{bmatrix} s_2 + \frac{1}{\sqrt{2}} x_1 - \frac{1}{\sqrt{2}} x_2 \\ -s_2 + \frac{1}{\sqrt{2}} x_1 + \frac{1}{\sqrt{2}} x_2 \end{bmatrix} \quad (11)$$

$$\Rightarrow x_1 = \frac{1}{\sqrt{2}} (y_{1,U1} + u_{2,U1})$$

$$\begin{bmatrix} y_{1,U2} \\ y_{2,U2} \end{bmatrix} = Y_2' - \begin{bmatrix} s_2 \\ -s_2 \end{bmatrix} = \begin{bmatrix} s_1 + \frac{1}{\sqrt{2}} x_1 - \frac{1}{\sqrt{2}} x_2 \\ s_1 + \frac{1}{\sqrt{2}} x_1 + \frac{1}{\sqrt{2}} x_2 \end{bmatrix}. \quad (12)$$

$$\Rightarrow x_2 = \frac{1}{\sqrt{2}} (y_{2,U2} - y_{1,U2})$$

Thus, in the method of FIG. 2, by applying a bi-directional half-duplex TDD communication system with precoding, and by utilizing self-interference cancellation, uplink and downlink may be realized within two time slots. This provides a significant enhancement to spectrum efficiency.

FIG. 3 illustrates the apparatus implementation. The communication arrangement of FIG. 3 includes two user stations 102 and 108, a relay station 110 and a destination station 120. The user stations communicate with the destination station only via the relay station. The user stations and the relay station may be mobile stations, and the destination station may be a base station, for instance.

The user station 102 is illustrated in more detail in FIG. 3. Only units relevant to the embodiment have been shown. The user station includes a transmitter 330 and a receiver 332. The transmitter and the receiver may include hardware and/or software that are needed to provide a bi-directional radio link for the user station 102. Specifically, the transmitter and receiver may be coupled to at least two radio antennas of the user station. That is, the transmitter may transmit via the two antennas, and the receiver may receive via the same at least two antennas. Transmission and reception may be time divided such that transmission occurs in a different timeslot than reception. The user station 102 may apply TDD, for instance, where some of the timeslots of a communication frame are for transmission and some for reception. FIG. 3 shows a channel estimator 321 configured to estimate channel coefficients of the various communication channels. That is, the user station may apply MIMO communication where each of the transmitting ends and the receiving ends has at least two radio antennas. In most embodiments, two or four antennas are provided. If both ends have two antennas, four communication channels exist. The channel estimator may estimate channel coefficients of each of the four communication channels. A channel coefficient depicts the delay and the attenuation, which the communication channel has caused to the signal. When the channel coefficients have been estimated, a channel coefficient matrix may be established for use in subsequent processing in the user station 102.

The channel coefficient matrix may be output to a precoder 322. The precoder may also input a transmit signal, which is to be transmitted to the destination station 120. The precoder may precode the transmit signal with the channel information so as to cancel the effect of the channel to the transmit signal before transmission.

A first controller 324 may input the precoded transmit signal, and control the transmission thereof in a first timeslot. The first controller may control the transmission such that the same transmit signal be transmitted via both transmit antennas of the user station 102 simultaneously. For the transmission, the first controller may be coupled to the transmitter 330.

The user station may also include a second controller 326. The second controller may be configured to process a receive signal via the at least two antennas of the user station, and transmitted by a relay station via at least two transmit antennas. The receive signal may be received in a second time-slot, which may be the next timeslot after the first timeslot. However, this is not necessarily the case. The first timeslot, in which transmission by the user station is carried out, may the second timeslot of the frame, for instance. The frame may have eight timeslots, and the TDD downlink may include timeslots 5 to 8, for instance. The timeslot, the second timeslot, in which the user station receives, may be timeslot number six, for instance. Thus, the first timeslot (transmission) and second timeslot (reception) may belong to the same frame but may also belong to different frames.

A second user station 108 is also shown in FIG. 3. The second user station may be similar to the first user station 102.

FIG. 3 also shows the relay station 110. The relay station 110 may apply an amplify- and forward relay protocol. The relay station includes a receiver 340, which may forward the received signal to an amplification unit for amplification. The amplified signal may be forwarded to a transmitter 342 for transmission. The relay station 110 may receive in a first timeslot signals from both user stations and the destination station 120, and may forward the received combination signal in a second timeslot following the first timeslot.

FIG. 3 also shows the destination station 120. The destination station 120 may be configured to communicate with at least two user stations. In FIG. 3, the destination station 120 is configured to communicate with the user stations 102 and 108 via the relay station 110. For provision of the bi-directional communication link, a transmitter 350 and a receiver 352 may be provided. The transmitter and receiver may share at least two antennas of the destination station.

In the same way as the first user station 102, the destination station 120 may include a channel estimator 354, and a precoder 356. The precoder 356 may apply unitary precoding, for instance. In precoding, the transmit signals to both the first user station 102 and second user station 108 may be mixed to provide a combination signal. The combination signal may then be transmitted via both antennas of the destination station 120.

The destination signal may include a first controller 358. The first controller may control transmission to both user stations, via the relay station, in a first timeslot. The second controller may control reception in a second timeslot, via the relay station, from both user stations 102 and 108. The destination station 120 may also include a cancellator, which may be configured to cancel the signal transmitted in the first timeslot from the receive signal. The residual signal may be used for subsequent detection of the transmit signals from the first and second user stations.

In FIG. 3, the number of antennas in the stations may be the following. The relay station may serve as many user stations as it has antennas. In the example of FIG. 3, the relay station may have two antennas to serve two user stations 102 and 108. Equally, each user station may have as many antennas as there are user stations. Typically, the number of antennas may be 2 or 4, for instance.

In FIG. 3, the user station 102 and the destination station 120 have above been presented as mobile stations or base stations. However, it is understood that the entities 321 to 328 of the user station 102 may also be in a sub-configuration of a mobile station. Such a sub-configuration may be one or more chips, integrated circuits or processors, for instance.

The embodiments described herein may be implemented by various means. For example, they may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, implementation can be through modules of at least one chip set (e.g., procedures, functions, and so on) that perform the functions described herein. The software codes may be stored in a memory unit and executed by processors. The memory unit may be implemented within the processor or external to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in given Figures, as will be appreciated by one skilled in the art.

The disclosed functionality may be implemented by way of a computer program product encoding a computer program of instructions for executing a computer process. The computer program product may be implemented on a computer program distribution medium. The computer program distribution medium may be any of the known ways of distributing software, such as a computer readable medium, a program storage medium, a record medium, a computer readable memory, a computer readable software distribution package, a computer readable signal, a computer readable telecommunication signal, and a computer readable compressed software package.

A channel estimator configured to estimate channel coefficients of communication channels of multiple-input-multiple-output communication may be provided. As the MIMO communication channel, such as a 2×2 channel, includes a plurality of channels, a channel coefficient may be estimated for each channel.

A precoder configured to apply the estimated channel coefficients to precode a transmit signal to cancel impact of the communication channels on the transmit signal may be provided. The precoder, or pre-equalizer, may cancel the channel impact before the transmission. In the case of the a user station, the precoder may be a ZF-precoder, for instance. In the case of a base station receiving/transmitting at least two user signals, the precoder may be a unitary precoder, for instance.

A first controller configured to provide the transmit signal for multiple-input-multiple-output transmission in a first timeslot, and a second controller configured to process a multiple-input-multiple-output receive signal received in a second timeslot following the first timeslot may be provided. The transmission and reception may thus be carried out in two timeslots.

Furthermore, a cancellator configured to cancel the transmit signal from the receive signal may be provided. If the transmitter has transmitted more than one user signals, such as may be in the case of a base station, each of these transmitted signals may be cancelled. The transmitted signals may be cancelled from each receive signal received via different receive antennas.

A channel estimator may be configured to estimate the channel coefficients on the basis of a receive signal received in a receive duplex of a time division duplex frame. Thus, the embodiment may be applied in a TDD system, wherein a station may measure the channel in a receive duplex, and utilize the channel quality information in a transmit duplex.

The first controller may be configured to provide the same transmit signal for transmission to a receiving station via at least two transmit antennas. The signals transmitted via at least two antennas may be exact replicas of each other.

The second controller may be configured to process receive signals received via two radio antennas, the apparatus comprising a signal estimator configured to estimate a desired signal, the signal estimator being, in estimation of the desired signal, configured to form a sum of receive signals received via the two radio antennas, multiply the sum with one per square-root of two. Thus, the formula according to (11) may be applied in the station that has transmitted the same signal via both antennas.

The first controller may be configured to provide the transmit signal for transmission via a first radio antenna, and a negation of the transmit signal for transmission via a second transmit antenna. Thus, a minus-signed signal of the signal transmitted via the first antenna may be transmitted via the second antenna.

The second controller may be configured to process receive signals received via two radio antennas, the apparatus comprising a signal estimator configured to estimate a desired signal, the signal estimator being, in estimation of the desired signal, configured to form a difference of receive signals received via the two radio antennas, multiply the sum with one per square-root of two. Equation (12) may be applied in a station, which has transmitted a minus-signed replica of the signal transmitted via the other antenna.

The second controller, of a base station for instance, may be configured to process receive signals received via two radio antennas, the apparatus comprising a signal estimator configured to estimate two desired signals each transmitted by different stations, the signal estimator being, in estimation of the desired signals, configured to in estimation of the first desired signal form a sum of the receive signals received via the two radio antennas, multiply the sum with one per two, and in estimation of the second desired signal, form a difference of the receive signals received via the two radio antennas, and multiply the sum with one per square-root of two. Thus, the equations (9) and (10) may be applied in a station to estimate the two user signals.

The apparatus may comprise a transceiver configured to transmit the transmit signal and receive the receive signal from a relay station of a relaying system. The apparatus may be a mobile station or a base station, for instance.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
   a channel estimator configured to estimate channel coefficients of communication channels of multiple-input-multiple-output communication;
   a precoder configured to apply the estimated channel coefficients to precode a transmit signal to cancel impact of the communication channels on the transmit signal;
   a first controller configured to provide the precoded transmit signal for multiple-input-multiple-output transmission in a first timeslot;

a second controller configured to process a multiple-input-multiple-output receive signal received in a second timeslot following the first timeslot; and a cancellator configured to cancel the transmit signal from the receive signal, wherein the first controller is configured to provide the transmit signal for transmission via a first radio antenna, and a negation of the transmit signal for transmission via a second transmit antenna, and wherein the second controller is configured to process receive signals received via two radio antennas, the apparatus comprising a signal estimator configured to estimate a received signal, the signal estimator being, in estimation of the received signal, configured to:

form a difference of receive signals received via the two radio antennas;

multiply the difference by one divided by the square-root of two.

2. An apparatus according to claim 1, wherein the estimator is configured to estimate the channel coefficients on the basis of a receive signal received in a receive duplex of a time division duplex frame.

3. An apparatus according to claim 1, wherein the precoder is configured to precode at least two transmit signals each targeting to a different receiving station, wherein the cancellator is configured to cancel the at least two transmit signals from the receive signal.

4. An apparatus according to claim 1, comprising a signal estimator configured to estimate one or more received signals from the receive signal from which the transmit signal has been cancelled.

5. A transceiver comprising an apparatus according to claim 1, comprising:

at least two radio antennas;

a transmitter configured to transmit the transmit signal via each of the at least two radio antennas;

a receiver configured to receive a receive signal via the at least two radio antennas; and wherein the cancellator is configured to cancel the transmit signal from each receive signal received via each of the at least two radio antennas.

6. An apparatus according to claim 1, comprising a transceiver configured to transmit the transmit signal and receive the receive signal from a relay station of a relaying system.

7. An apparatus according to claim 1, wherein the apparatus is one of a mobile station or a base station.

8. An apparatus, comprising:

a channel estimator configured to estimate channel coefficients of communication channels of multiple-input-multiple-output communication;

a precoder configured to apply the estimated channel coefficients to precode a transmit signal to cancel impact of the communication channels on the transmit signal;

a first controller configured to provide the precoded transmit signal for multiple-input-multiple-output transmission in a first timeslot;

a second controller configured to process a multiple-input-multiple-output receive signal received in a second timeslot following the first timeslot; and a cancellator configured to cancel the transmit signal from the receive signal, wherein the precoder is configured to precode at least two transmit signals each targeting to a different receiving station, and wherein the second controller is configured to process receive signals received via two radio antennas, the apparatus comprising a signal estimator configured to estimate two received signals each transmitted by different stations, the signal estimator being, in estimation of the received signals, configured to in estimation of the first received signal:

form a sum of the receive signals received via the two radio antennas;

multiply the sum by one divided by two;

and in estimation of the second received signal:

form a difference of the receive signals received via the two radio antennas; and multiply the difference by one divided by the square-root of two.

9. An apparatus according to claim 8, wherein the estimator is configured to estimate the channel coefficients on the basis of a receive signal received in a receive duplex of a time division duplex frame.

10. An apparatus according to claim 8, wherein the precoder is configured to precode at least two transmit signals each targeting to a different receiving station, wherein the cancellator is configured to cancel the at least two transmit signals from the receive signal.

11. An apparatus according to claim 8, comprising a signal estimator configured to estimate one or more received signals from the receive signal from which the transmit signal has been cancelled.

12. A transceiver comprising an apparatus according to claim 8, comprising:

at least two radio antennas;

a transmitter configured to transmit the transmit signal via each of the at least two radio antennas;

a receiver configured to receive a receive signal via the at least two radio antennas; and wherein the cancellator is configured to cancel the transmit signal from each receive signal received via each of the at least two radio antennas.

13. An apparatus according to claim 8, comprising a transceiver configured to transmit the transmit signal and receive the receive signal from a relay station of a relaying system.

14. An apparatus according to claim 8, wherein the apparatus is one of a mobile station or a base station.

* * * * *